United States Patent [19]

King et al.

[11] Patent Number: 5,271,470

[45] Date of Patent: Dec. 21, 1993

[54] PLOW APPARATUS AND METHOD USING ACOUSTICS

[75] Inventors: Billy R. King, P.O. Box 516, Zephyr, Tex. 76890; Walter F. Rausch, Kansas City, Kans.

[73] Assignee: Billy R. King, Zephyr, Tex.

[21] Appl. No.: 688,665

[22] Filed: Apr. 19, 1991

[51] Int. Cl.⁵ .................. A01B 35/00; A01B 79/00
[52] U.S. Cl. ........................... 172/40; 172/1; 172/33; 47/1.3; 47/DIG. 12
[58] Field of Search .................. 172/1, 40, 33; 47/1.3, 47/DIG. 12; 111/200; 204/157.42; 422/20, 127, 128; 171/116, 122

[56] References Cited

U.S. PATENT DOCUMENTS

| | | | |
|---|---|---|---|
| 1,018,513 | 2/1912 | Meyer | 172/33 |
| 1,044,860 | 11/1912 | Cole | 172/33 |
| 1,276,843 | 8/1918 | Wentworth | 172/1 |
| 1,777,391 | 10/1930 | Brewer | 422/127 X |
| 2,627,712 | 2/1953 | Chatten | 171/126 X |
| 2,783,698 | 3/1957 | Bambi | 172/1 X |
| 2,788,725 | 4/1957 | Wilkey et al. | 172/33 |
| 2,986,841 | 6/1961 | MacDonald | 172/33 X |
| 3,307,289 | 3/1967 | Lemm | 172/40 X |
| 3,461,969 | 8/1969 | Bodine, Jr. | 172/40 X |
| 3,747,687 | 7/1973 | Bodine | 172/40 |
| 3,902,273 | 9/1975 | Friedman | 47/DIG. 12 |
| 4,092,800 | 6/1978 | Wayland, Jr. et al. | 47/1.3 |

FOREIGN PATENT DOCUMENTS 538673 1/1977 U.S.S.R. .................. 47/1.3

OTHER PUBLICATIONS

*Biological Effects of Ultrasound: Mechanisms and Clinical Implications*, NCRP Report No. 74, National Council on Radiation Protection and Measurements, Bethesda, Maryland (1983), Chapters 6 and 7.

*Primary Examiner*—Randolph A. Reese
*Assistant Examiner*—Spencer Warnick
*Attorney, Agent, or Firm*—Geoffrey A. Mantooth

[57] ABSTRACT

The plow apparatus has plow blades to break up the soil in the plowed field. The broken up soil is scooped up with scooper blades by the forward motion of the plow apparatus and then conveyed to rotating tillers. The tillers break up the soil into smaller clumps. The tilled soil is then exposed to acoustical energy provided by acoustical transducers. The acoustical energy is of a sufficiently high intensity so as to kill or destroy weed seeds and insect larvae in the soil. The soil is then returned to the ground.

7 Claims, 8 Drawing Sheets

PLOW APPARATUS AND METHOD USING ACOUSTICS

FIELD OF THE INVENTION

The present invention relates to plow apparatuses and methods such as are used in agricultural applications.

BACKGROUND OF THE INVENTION

When a farmer is preparing his field for planting a new crop, he must conduct several operations on the soil. The farmer uses a plow to break up the soil. He plows the soil until it is satisfactorily broken up into small clumps. This may be accomplished with several pieces of equipment. The first piece of plowing equipment initially breaks up the soil into large clumps, while the second piece of equipment breaks the large soil clumps into smaller clumps. Then, the farmer plants the seed into the plowed field.

The several plowing and planting operations all require different pieces of equipment that are towed behind a tractor. As such, the farmer must make several passes with the tractor over the same ground. This adds to his fuel costs and time. It also increases water loss in the soil, because when the soil is left lying in the field between plowing operations, water evaporates from the newly exposed soil particles. On the next plowing pass, additional soil particles are exposed to the air and suffer water evaporation. Water loss in the soil is of particular concern to farmers in dry regions. Thus, there is a need to minimize the number of passes made with plowing equipment over the ground.

Furthermore, when a farmer plants a new crop, he ideally wishes the soil to be rid of all insect pests and weeds, both of which can be detrimental to his crop. Prior art methods of pest and weed control utilize applications of chemical insecticides and herbicides to the soil. Such chemicals are expensive in and of themselves and expensive to apply to fields. Furthermore, these chemicals, when used year after year, degrade the land by their toxicity.

SUMMARY OF THE INVENTION

It is an object of the present invention to provide a plow apparatus that will plow the land and ready it for planting in a minimal number of passes over the ground.

It is a further object of the present invention to provide a plow apparatus that will plow the land and ready it for planting in a single pass over the ground.

Still another object of the present invention is to provide a plow apparatus and method that will kill insect larvae and weed seeds in the soil during plowing operations.

Still another object of the present invention is to provide an apparatus and method that will kill insect larvae and weed seeds in the soil, without the use of chemical insecticides and herbicides.

The plow apparatus of the present invention includes a frame having front and rear ends. The frame has rotatable wheels mounted thereto. The wheels allow the plow apparatus to move over ground. The frame has hitch means coupled to the frame end. The hitch means is adapted to couple the plow apparatus to a towing vehicle. Plow blade means for breaking up the soil when the plow apparatus is moved along the ground is also provided. The plow blade means is coupled to the frame. The plow apparatus has scooper means for scooping up the soil that has been broken up by the plow blade means. The scooper means extend horizontally and is located rearwardly of the plow blades means and at the same depth as the plow blade means. The scooper means is coupled to the frame. Tilling means is provided for tilling the soil that has been broken up by the plow blade means. The tilling means is coupled to the frame at a position that is rearwardly of the scooper means. The tilling means comprises plural arms that are rotatable so as to further break up the soil. Conveyance means conveys the broken up soil that has been scooped up by the scooper means to the tilling means.

In one aspect, the plow blade means comprises plural ripper shanks that are arranged across a width of the frame at spaced apart intervals. The conveyance means includes plural sprocket-driven endless chains. The chains are arranged so as to be parallel to each other. The conveyance means also includes plural slats that extend across the chains. The slats are spaced apart. The tilling means includes plural flailing arms that extend out and are adapted to flail the soil. In still another aspect, the plow apparatus includes seed planting means that is coupled to the frame rear end.

In still another aspect, the plow apparatus includes a frame, plow blade means, and acoustical transducer means. The frame has front and rear ends and has rotatable wheels mounted thereto. The wheels allow the plow apparatus to move over ground. The frame has hitch means coupled to the frame front end. The hitch means is adapted to couple the plow apparatus to a towing vehicle. The plow blade means is for breaking up the soil when the plow apparatus is moved along the ground. The plow blade means is coupled to the frame. The acoustical transducer means produces acoustical energy of a sufficiently high intensity so as to cause cellular disruption of biological life forms in the soil, wherein weed seeds and insect larvae are killed. The acoustical transducer means is coupled to the frame and is located rearwardly of the plow blade means so as to expose the broken up soil to acoustical energy.

With the plow apparatus of the present invention, the dirt in a field can be plowed and seed can be planted in one pass over the ground. In addition, the soil can be treated for insects and weeds without chemicals. Instead, acoustical energy, which leaves no residue in the soil, is used to kill or destroy insect larvae and weed seeds.

DESCRIPTION OF PREFERRED EMBODIMENT

Figure 1:
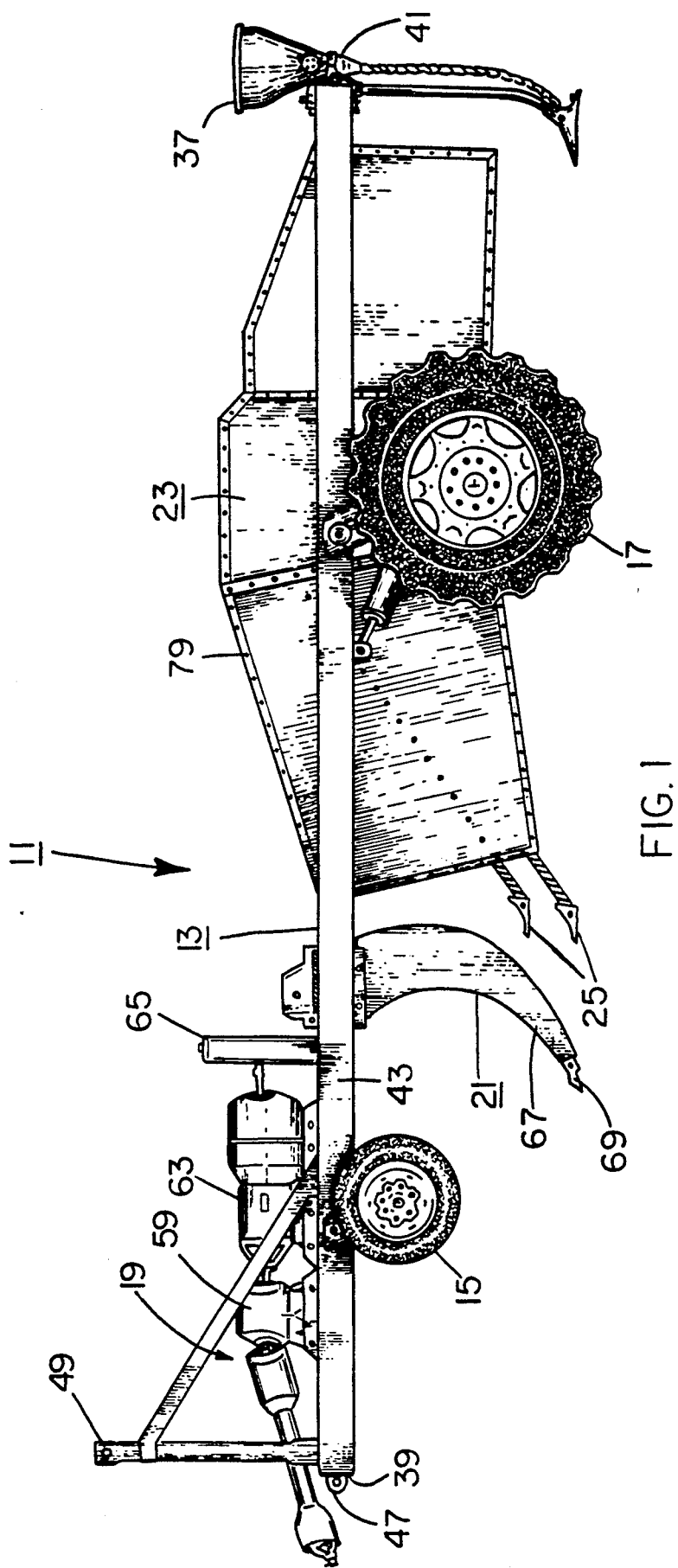
FIG. 1 is a side elevational view of the plow apparatus of the present invention, in accordance with a preferred embodiment.

In FIG. 1, there is shown a side view of the plow apparatus 11 of the present invention, in accordance with a preferred embodiment. The plow apparatus 11 is towed behind a tractor over the ground. The plow apparatus readies the ground for planting in one pass over the ground by breaking up the soil or dirt into small pieces and then exposing the soil to acoustical energy to kill insect larvae and weed seeds. In addition, seed planting equipment can be mounted to the rear of the plow apparatus so that seeds can be planted in the freshly plowed earth. The provision of the seed planting equipment on the plow apparatus allows a farmer to prepare and plant his field in one pass over the ground.

In the preferred embodiment, the plow apparatus 11 includes a frame 13, wheels 15, 17, a power source 19, plow blades 21, a soil processing enclosure 23, scooper blades 25, entrance conveyors 27 (see FIG. 2), tillers 29, an exit conveyor 31, an acoustical transducer arrangement 33 and seed planting equipment 37.

Figure 3A:
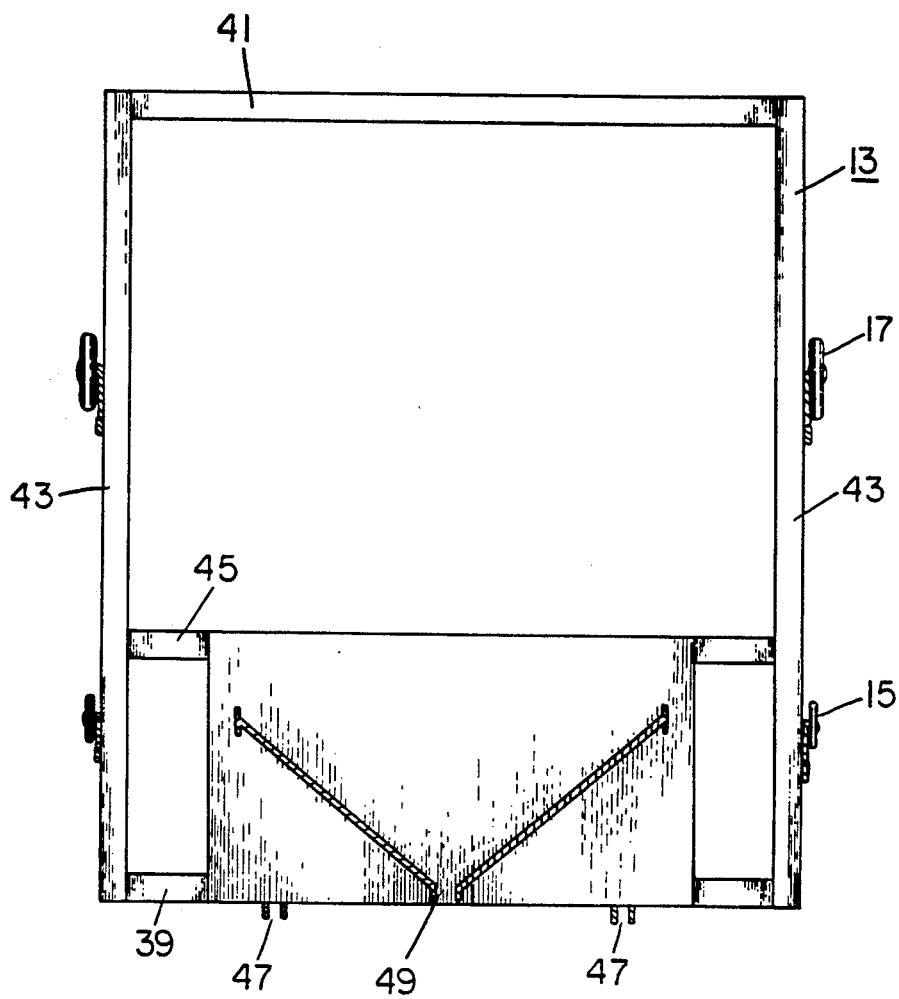
FIG. 3A is a top view of the frame.
Figure 3:
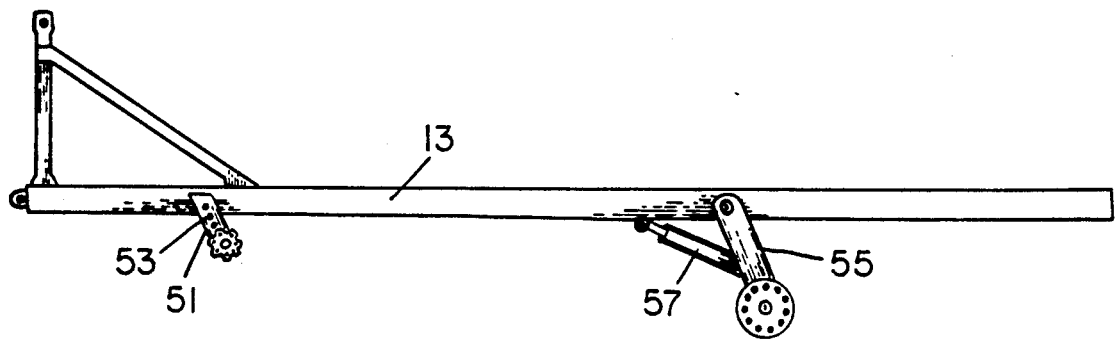
FIG. 3 is a side view of the frame of the plow apparatus, shown without the wheels.

Referring to FIGS. 3 and 3A, the frame 13 is generally rectangular, having front and rear ends 39, 41 and sides 43. The frame 13 is made from steel beams or bars and may have one or more cross beams 45 extending between the sides, for rigidity and strength. A hitch 47 for coupling to the rear end of a tractor is provided on the front end 39 of the frame 13. In addition, a top link 49 is provided at the front end 39 for coupling to a three point hitch on a tractor.

Attached to the frame 13 are a set of front wheels 15 and a set of rear wheels 17. The front wheels 15 are of the ribbed type and are smaller than the rear wheels 17, which are of the traction type. The front wheels 15 are mounted to the sides 43 of the frame 33 by way of struts 51. The struts 51 each have plural openings 53 therein for receiving the respective front wheels 15 and for allowing the adjustment of the height of the frame above the ground. The rear wheels 17 are also mounted to the frame by way of struts 55. One end of each rear wheel strut 55 is pivotally coupled to the frame 13. A hydraulic cylinder 57, extending between the frame 13 and a respective strut 55, controls the position of the strut so as to adjust the height of the frame above the ground.

Referring to FIG. 1, the power source 19 drives the moving parts of the plow apparatus. In the preferred embodiment, the power source includes a hydraulic pump 59 mounted to the frame 13. Hydraulic lines exit the pump and connect to hydraulic motors that move the various moving parts such as the conveyors 27, 31. The hydraulic pump 59 is powered by a power-take-off on the towing tractor. The plow apparatus 11 is provided with a drive shaft 61 that couples to the power-take-off of the tractor. The drive shaft 61 is rotatively coupled to the hydraulic pump 59, which in turn is rotatively coupled to an electric generator 63. A fan 65 is provided to cool the hydraulic fluid. The fan 65 is rotatively coupled to the drive shaft 61 by way of the pump 59 and the generator 63. The hydraulic pump 59 could be powered by an internal combustion engine on the plow apparatus instead of by the power-take-off, thereby making the plow apparatus self-powered. In addition, many types of power sources and motors besides the hydraulic pump and hydraulic motors can be used to drive the conveyors and other moving parts on the plow apparatus. For example, the electric generator 63 could produce sufficient electrical power to operate electric motors. Or, the drive shaft 61 could mechanically power the conveyors and other moving parts by way of chains and gears.

Figure 4:
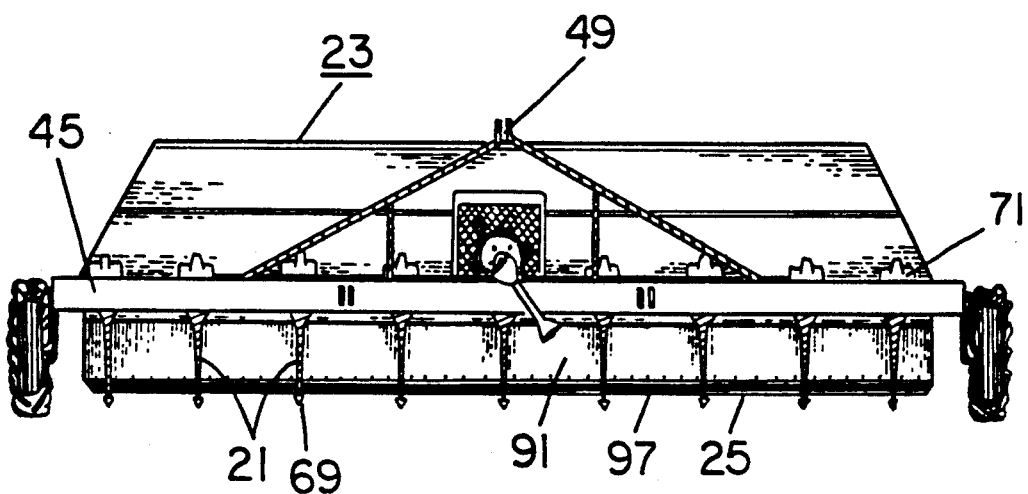
FIG. 4 is a front view of the plow apparatus shown with the front end of the frame broken away to show the cross beam and plow blades.

The plow apparatus has plural plow blades 21 coupled to a cross beam 45 such that the plow blades extend across the width of the plow apparatus (see FIGS. 1 and 4). The plow blades 21 are conventional ripper shanks having long thin curved shanks 67 that are vertically oriented. Shovel points 69 tip the lower end of the shanks 67. Each shank 67 is coupled to the cross beam 45 by way of a coupling member 71. Each coupling member 71 is shaped like a side ways "U", having top, rear and bottom walls. Each coupling member 71 matingly receives the cross beam 45, and is bolted in place. The coupling members 71 allow the respective plow blades 21 to be removed from or added to the cross beam 45 as the particular plowing operation requires. Also, the coupling members 71 allow the position of the plow blades 21 along the cross beam 45 to be adjusted. Thus, the plow blades can be spaced close together for some plowing operations or further apart for other plowing operations. A common spacing is 1.5 feet between plow shanks 67.

Figure 2:
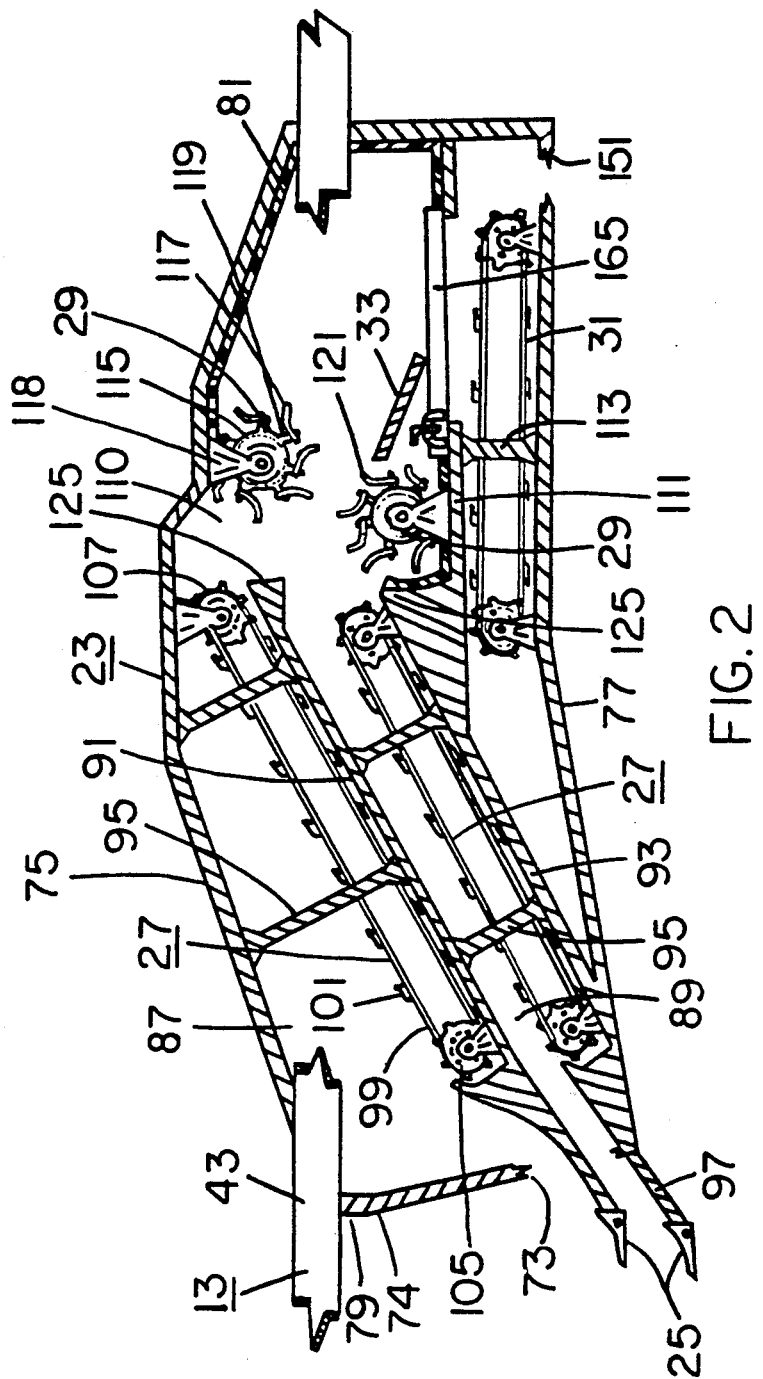
FIG. 2 is a longitudinal cross-sectional side view of the enclosure of the plow apparatus.

Referring to FIGS. 1 and 2, the soil processing enclosure 23 is located between the plow blades 21 and the rear end 41 of the frame 13. The soil processing enclosure 23 takes the broken up soil produced by the plow blades 21 and breaks the soil up further to the desired particle size. Broken up soil enters the soil processing enclosure 23 through openings 73 in the front end 74. The soil is then conveyed to the tillers 29 which act to break up the soil. The tilled soil is then passed by the acoustical transducer arrangement 33. Then, the soil exits the enclosure 23 where it is dumped back onto the ground.

Figure 6:
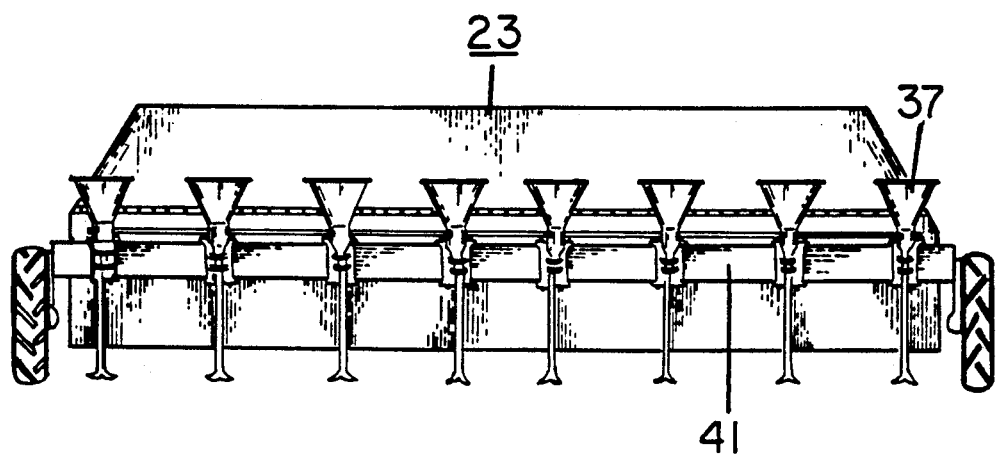
FIG. 6 is a rear view of the plow apparatus.

The soil processing enclosure 23 is made of top, bottom and side walls 75, 77, 79. The soil processing enclosure 23, which extends across the width of the frame, as shown in FIGS. 4 and 6, is coupled to the frame 13. The walls of the enclosure 23 are made of metal. The walls that surround the acoustical transducer arrangement 33 have an interior lining of fiberglass to absorb the acoustical energy and to protect the metal walls from acoustical fatigue.

At the front end of the enclosure there are upper and lower chambers 87, 89 that extend from the front end 74 of the soil processing enclosure to the tillers 29. The upper chamber 87 is formed by the top wall 75, the side walls 79 and a first wall 91 that extends diagonally upward from the front end 74 of the enclosure toward the tillers 29. The lower chamber 89 is formed by the first wall 91, the side walls 79 and a second wall 93 that is generally parallel to the first wall 91. The first and second walls 91, 93 are supported by support members 95 that extend between the top wall 75 and the first wall 91, the first and second walls 91, 93 and the second wall 93 and the bottom wall 77. The support members 95 are bars or struts that are located near the side walls 79. The enclosure 23 has openings 73 in its front end 74 that communicate with the upper and lower chambers 87, 89. The upper and lower chambers 87, 89 are open at their rear end so as to communicate with the tillers 29. At the front end of each chamber is a scooper blade 25 that is generally horizontal and that extends across the width of the plow apparatus. The upper scooper blade 25 is an extension of the first wall 91, while the lower scooper blade 25 is coupled to an extension wall 97 extending from the front end 74 of the enclosure 23. Both scooper blades 25 are inclined so as to guide soil up into the enclosure 23. The front ends of the scooper blades 25 are located rearwardly of the plow blades 21. The walls 91, 97 to which the scooper blades 25 are attached can be either flat as shown or they could curve upwardly from the front to the rear.

Figure 5:
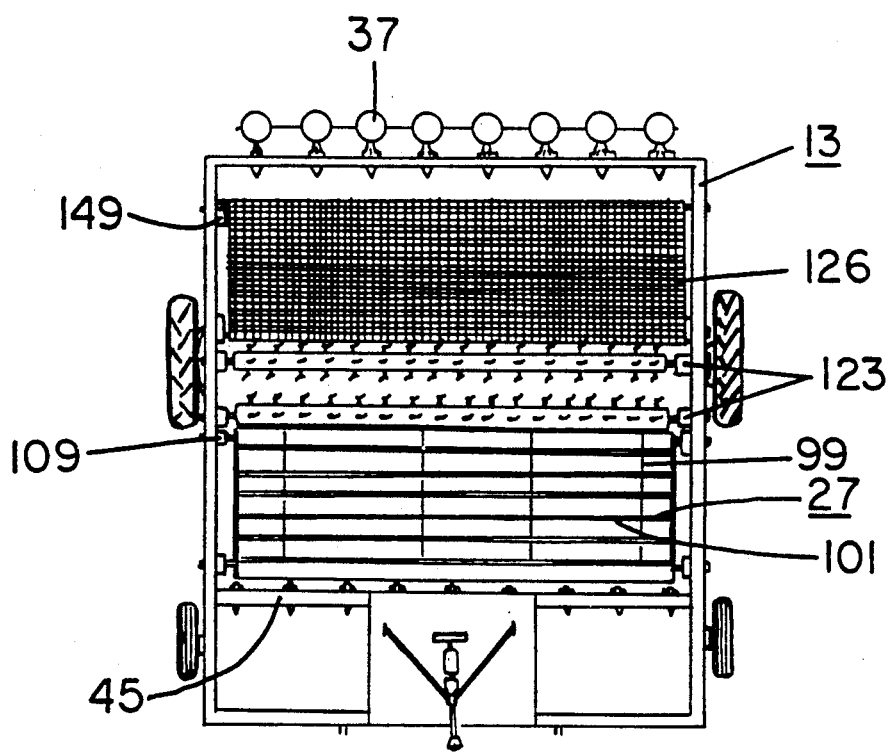
FIG. 5 is a top view of the plow apparatus, showing the interior of the enclosure.

Referring to FIGS. 2 and 5, the upper and lower chambers 87, 89 have respective conveyors 27 for moving soil from the front end 74 of the enclosure 23 to the tillers 29. The conveyors 27 are conventional, commercially available chain mats, such as Lindermann chains, that extend the width of the enclosure 23. Each conveyor 27 is made up of plural endless chains 99 that are parallel to each other. The chains in each conveyor are coupled together by numerous slats 101. The slats 101, which are made of angle iron, are perpendicular to the chains 99. The slats 101 are spaced apart at some desired spacing. The conveyors 27 are rotated by sprockets 105, 107 which engage the chains 99. The sprockets are coupled to the walls of the enclosure 23. Hydraulic motors 109, powered by the hydraulic pump 59, rotate the rear sprockets 107. The conveyors 27 are rotated in a clockwise direction, with respect to the orientation shown in FIG. 2 so that dirt is transported on the conveyors 27 from the scooper blades 25 to the tillers 29. In order to feed soil onto the upper surfaces of the conveyors 27, the upper surfaces of the walls 91, 97 are configured to merge with the upper surfaces of the conveyors. Hydraulic motors, plow blades and other types of equipment are described in *Farm Machinery And Equipment*, Smith & Wilkes, 6th Edition, McGraw-Hill, 1976.

The tillers 29 are located in a large chamber 110 that is rearward of the conveyors 27 (see FIGS. 2 and 5). The tilling chamber 110 is formed by the top and side walls 75, 79 of the enclosure 23 and also by a third wall 111. The third wall 111 is supported above the bottom wall 77 of the enclosure by support members 113. At the front end of the tilling chamber 83 are the tillers 29 which are conventional. There is an upper tiller that is mounted to the top wall 75 of the enclosure 23 and a lower tiller that is mounted to the third wall 111. Each tiller 29 is made up of a long cylinder 115 extending the width of the enclosure and studded with multiple flailing arms 117. The cylinders 115 are rotatably mounted to the enclosure 23 by way of brackets 118. Each arm 117 has a fixed portion 119 that is mounted to the respective cylinder 115 and a movable portion 121 that is coupled to the free end of the fixed portion 119. The tillers 29 are rotated in opposite directions by hydraulic motors 123, which are powered by the hydraulic pump 59. Thus, referring to the orientation shown in FIG. 2, the upper tiller rotates counterclockwise and the lower tiller rotates clockwise. The tillers 29 are located immediately rearwardly and below the rear ends of the conveyors 27, such that the conveyors dump their load of dirt onto the tillers. The rear ends of the chambers 87, 89 are configured with guides 125 to channel the soil from the conveyors 103 to the tillers 29.

Figure 7:
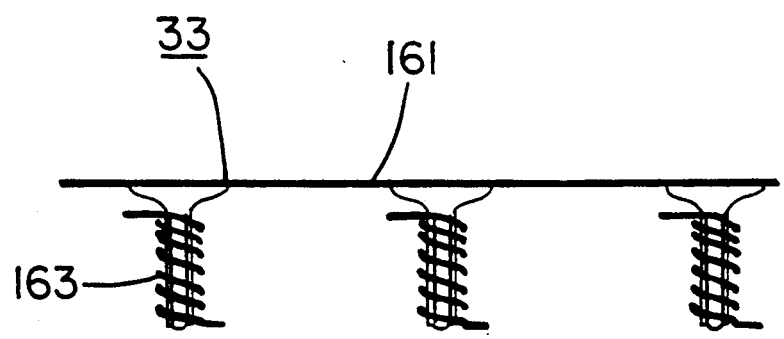
FIG. 7 is a schematic view of the acoustical transducer arrangement of FIG. 2.

Located below the tillers 29, is the acoustical transducer arrangement 33 (see FIGS. 2 and 7). The acoustical transducer arrangement 33 treats the tilled soil so as to kill, destroy or otherwise render inoperable the weed seeds, insects and insect larvae. It has been shown that high intensity acoustical energy disrupts and even destroys living cells. NCRP, *Biological Effects of Ultrasound: Mechanisms and Clinical Implications*, NCRP Report No. 74, National Council on Radiation Protection and Measurements, Bethesda, Md. (1983). The plow apparatus 11 utilizes this concept to treat the soil for insects and weeds during plowing operations.

The transducer arrangement 33 includes a metal plate 161 and plural acoustical transducers 163. The plate 161 is made of stainless steel and is located just below the tillers 29 so that the tilled dirt falls onto the plate. The plate 161 extends the length of the tillers 29 and is inclined downwardly from the tillers toward the rear end of the enclosure 23. An opening 165 in the third wall 111 is located rearwardly of the plate 161 and allows treated soil to fall therethrough. The individual transducers 163 are coupled, both mechanically and acoustically, to the underside of the plate 161. The transducers 163 are conventional and are electrically powered by the generator 63. In the preferred embodiment, the transducers 163 are surface mount magnetostrictive acoustical ultrasonic transducers. The plate 161 acts as an acoustical radiator, transmitting the acoustical energy from the transducers to the dirt. In the preferred embodiment, the plate is $\frac{1}{2}$ inch thick and the transducers are spaced about a foot apart. The transducers produce acoustical energy of between about 10 KHz to 40 KHz.

The sound intensity required for cellular disruption is about 1 watt per $cm^2$ or less. This is about 198 db of sound pressure level (measured against the standard reference pressure of 0.0002 dyne/$cm^2$). To compensate for attenuation, coupling loss and boundary loss, the acoustical transducers 163 must generate about 208 db. Coupling losses are reduced by allowing the dirt to directly contact the plate. In fact, by allowing the dirt to directly contact the plate 161, amount of power required is reduced. For a plate 161 having dimensions of fourteen feet long by two feet wide, about 3.2 kilowatts of power is produced by the arrangement 33.

Below the transducer plate 161 is the exit conveyor 31. The exit conveyor 31 is a chain mat extending beneath the opening 165. The exit conveyor 31 is substantially similar to the conveyors 27. Hydraulic motors 149 rotate the conveyor 31 in a clockwise direction (with reference to the orientation of FIG. 2). Thus, the treated dirt is conveyed to the rear end of the conveyor where it is dumped. The dirt exits the enclosure 23 by way of an opening 151 in the bottom wall 77.

The enclosure 23 is designed so as to provide shielding of the acoustical energy so that the amount of energy exiting the enclosure and entering the ambient air around the plow apparatus is minimized. This is done by making the tilling chamber 110 which houses the transducer arrangement 33 free of openings (with the exception of the opening 165) and by lining the walls 75, 79, 111 in the chamber 83 with fiberglass or some other material. Furthermore, the opening 165 is shielded from the outside by the exit conveyor 31.

The plow apparatus is also provided with conventional seed planters 37 at its rear end (see FIGS. 1 and 6). The seed planters 37 are mounted to the rear end 41 of the frame 13 in such a way so as to allow the position of the seed planters to be adjusted along the width of the plow apparatus. The seed planters can be removed or added to the rear end to provide variability in the density of sowing. The seed planters can be of the drill type, which cuts a furrow in soil and drops the seed in place. Alternatively, the seed planters can be of the row unit type, which also cut furrows and plants seeds.

Figure 8:
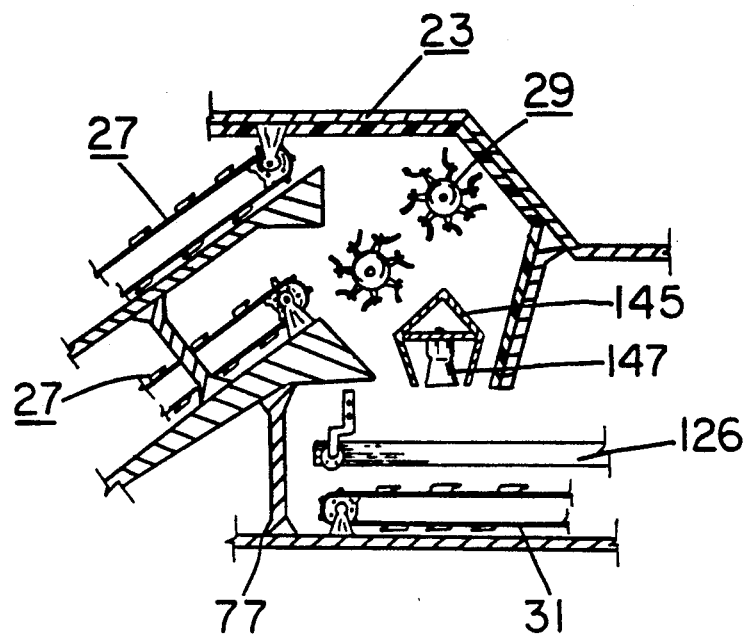
FIG. 8 is a side view of a portion of the interior of the enclosure, showing the tillers and the acoustical transducers in accordance with another embodiment.
Figure 9:
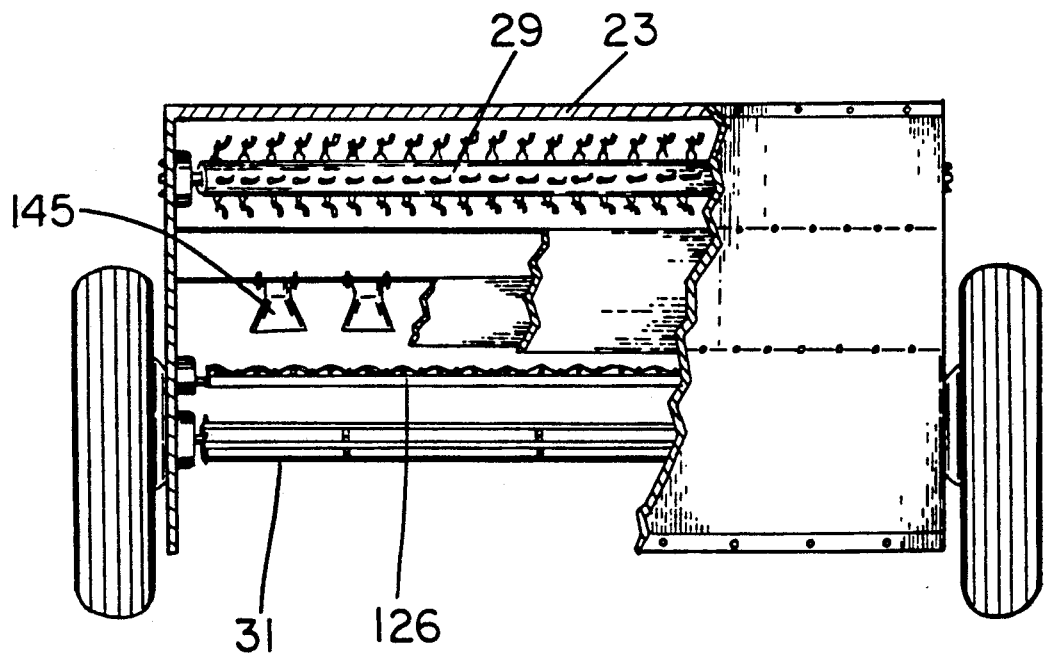
FIG. 9 is a rear view of the plow apparatus of FIG. 8, showing a portion of the interior of the enclosure.

In FIGS. 8 and 9, there is shown the rear portion of the enclosure 23, in accordance with another embodiment. In the plow apparatus, shown in FIGS. 8 and 9, horn-type acoustical transducers 147 have been utilized in lieu of the plate-type transducer arrangement 33 described above. The conventional transducers 147 are contained within a housing 145 that is closed on the top and side and open at the bottom. The housing 145 protects the transducers 147 from cascading dirt that exits the tillers 29. The transducers 147 may be of the Hartmann type which are pneumatically powered. An air compressor can be used in lieu of the generator 63 to power the transducers. The transducers 147 are oriented so as to point down towards the conveyor 31. The bank of transducers 147 extends the width of the enclosure so as to bathe the falling soil with acoustical energy.

The operation of the plow apparatus 11 will now be described. The plow apparatus is hitched to a towing vehicle such as a tractor, by way of the hitch 47 and the top link 49 on the front end 39. A medium sized tractor, such as 120–180 hp., can be used to tow the plow apparatus 11. The drive shaft 61 for the power source 19 is coupled to the tractor power-take-off.

Before towing the plow apparatus, the operator sets the depth at which the plow apparatus will operate; that is, how deep into the ground the plow blades 21 and scooper blades 25 will penetrate. The depth can be set either by adjusting the position of the rear wheels 17 relative to the frame 13 with the hydraulic cylinders 57, by adjusting the position of the front wheels 15 relative to the frame by moving the front wheels to the appropriate openings 53, by raising the front end 39 of the plow apparatus with the tractor, or by a combination of these methods.

Figure 10:
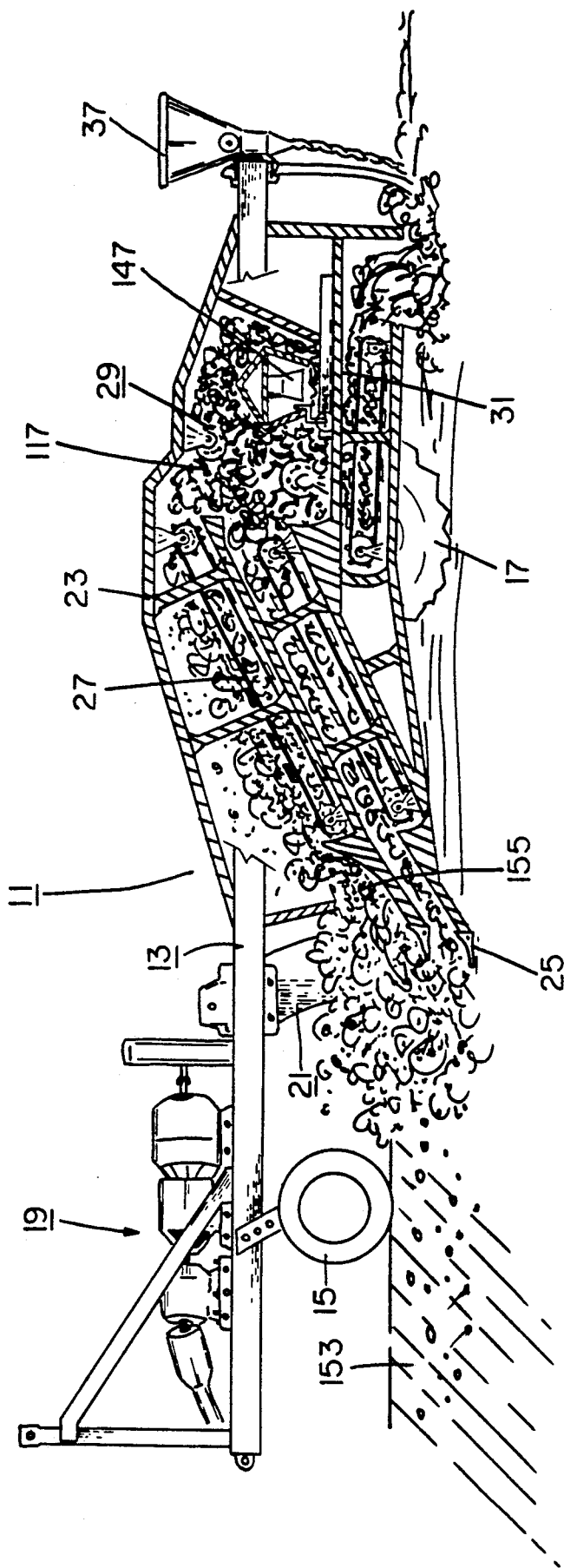
FIG. 10 is a side view of the plow apparatus in operation, showing the interior of the enclosure.

The tractor pulls the plow apparatus 11 in the forward direction (see FIG. 10). As it is being pulled, the plow blades 21 bite into the ground 153, breaking up and loosening the soil 155. The loosened soil 155 is then scooped up by the scooper blades 25 and moved onto the respective conveyor 27 by the forward motion of the plow apparatus. The conveyors 27 move the soil 155 up and back to the tillers 29. The conveyors 27 increase the ease of pulling the plow apparatus through the ground by reducing the amount of friction between the soil 155 and the surfaces of the plow apparatus 11. As the plow apparatus 11 is pulled through the ground, friction develops between the soil and the upper and lower chambers 87, 89 and the surfaces of these chambers. This friction is increased dramatically when the soil is wet. By utilizing the conveyors 27 to transport the soil from the scooper blades 25 to the tillers 29, the friction between the soil and the chambers is reduced. This reduction in friction enables the plow apparatus 11 to be pulled by a medium sized tractor (120–180 hp.), instead of a larger tractor (220 hp. or more).

The soil 155 on the conveyors 27 is dumped into the tillers 29, which then break up the soil. The rear ends of the conveyors 27 are located above the tillers 29 so that the soil falls by gravity through the tillers. The tillers 29 are rotated so as to flail the soil with the arms 117.

After being broken up by the tillers 29, the dirt is exposed to the acoustical energy produced by the transducer arrangement. If the plate transducer arrangement 33 is being utilized, the dirt contacts the plate 161. The high intensity acoustical energy produced by the transducer arrangement kills or renders harmless insects, insect larvae and eggs, rhizomes and weed seeds. The dirt travels across the plate 161 at about 2.5 to 5 miles per hour. The dirt is exposed to the acoustical energy for about ¼ to ½ seconds. The breaking up of the soil by the tillers 29 reduces the soil particle size and exposes more surfaces to the acoustical energy to assist in the penetration of the acoustical energy into the soil. The plate 161 extends across the width of the enclosure so as to expose all of the soil passing through the enclosure to acoustical energy. If the horn type transducer 147 arrangement is being utilized, the dirt passes by the transducers, wherein the dirt becomes exposed to the acoustical energy.

After the soil passes through the acoustical energy, it falls through the opening 165 to the exit conveyor 31. The exit conveyor 31 moves the tilled soil to the rear end of the enclosure 23. The exit conveyor 31 dumps the soil at the rear end, where the soil then falls through the rear opening 151 of the enclosure 23 and onto the ground 153. The exit conveyor 31 moves the soil rearwardly from the rear wheel 17 and also serves to provide shielding beneath the transducers. As the plow apparatus is pulled across the ground, the seed planters 37 furrow the freshly plowed soil and plant seed in the soil.

Figure 11:
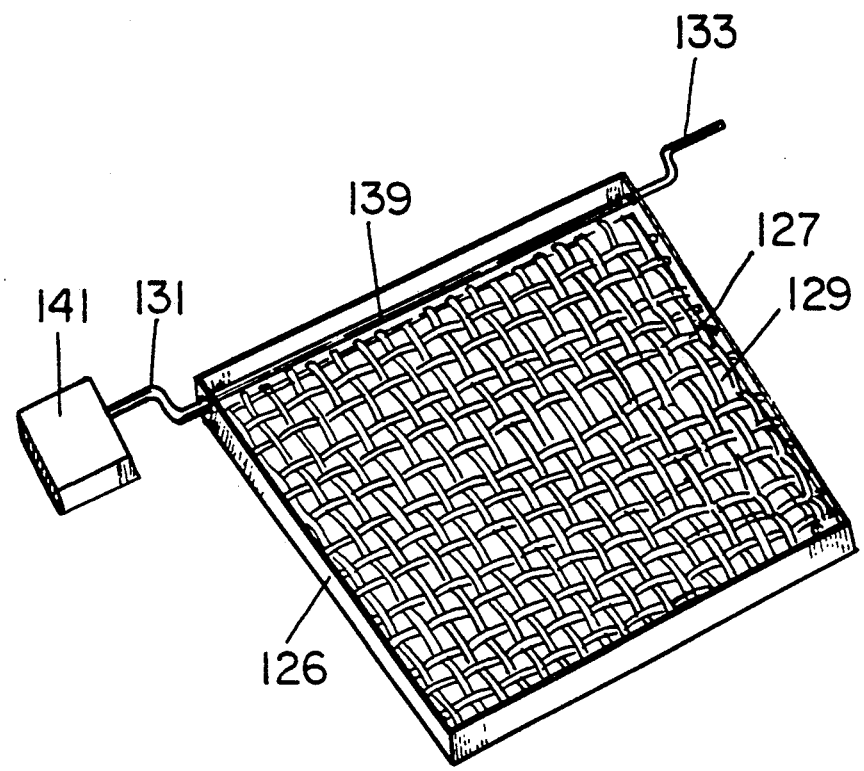
FIG. 11 is an isometric view of the screen.

In FIGS. 8 and 11, there is shown a rock and debris removal apparatus for use with the plow apparatus. The rock removal apparatus includes a grate or screen 126 located below the tillers 29. Referring to FIG. 11, the conventional screen 126 is made up of wire mesh 127, which forms openings 129 therethrough. The screen 126 is selected so as to pass soil particles of the desired size through the openings 129. Typical opening 129 sizes range from one-quarter inch to three inches. The screen 126 may be interchanged with other screens to provide suitable sized openings. The screen is tilted slightly so that the front end is higher than the rear end. Plural screens 126 can be laid side by side so as to extend the screen arrangement the full width of the enclosure 23.

The screen 126 is provided with a mechanism for vibrating the screen during plowing operations. The vibrating screen acts as a sifter, causing small particles of soil to pass therethrough while moving large objects, which are unable to pass through the screen, to the rear end of the chamber 110. The vibrating mechanism includes a shaft 131 and linkage arms 133. The shaft 131 has an eccentric "U" shaped portion 139. A hydraulic motor 141 rotates the shaft 131. The linkage arms 133 are coupled to the "U" portion 139 of the shaft 131. As the motor 141 rotates the shaft 131, the linkage arms 133 are carried up and down by the shaft, causing the screen 126 to move up and down. As the dirt falls from the tillers 29, it lands on the screen 126 The screen is vibrating, due to the action of the motor 141 and the shaft 131. The vibrating screen 126 causes small clumps of soil to fall through the openings 129, while causing items that are too large to pass through the openings, such as rocks and plant debris, to move toward the rear end of the enclosure and out of the way of freshly tilled dirt landing on the screen.

After the rear of the chamber has been filled with rocks and debris, the farmer tows the plow apparatus 11 to a dumping area. Once there, the farmer opens a rear door to the enclosure 23. Then, the front end of the plow apparatus is tilted up to cause the rocks and debris in the holding area to fall out onto the ground.

The screen 126 can be removed, wherein the plow apparatus 11 can be operated without the capability of removing rocks and debris. As a practical matter, the screen would typically be used only to initially clean up a field.

The foregoing disclosure and the showings made in the drawings are merely illustrative of the principles of this invention and are not to be interpreted in a limiting sense.

We claim:

1. A plow apparatus, comprising:
   a) a frame having front and rear ends, said frame having rotatable wheels mounted thereto, said wheels allowing said plow apparatus to move over ground, said frame being adapted to couple said plow apparatus to a towing vehicle;
   b) plow blade means for breaking up soil when said plow apparatus is moved along the ground, said plow blade means being coupled to said frame;
   c) acoustical transducer means for producing acoustical energy of a sufficiently high intensity so as to cause cellular disruption of biological life forms in said soil, wherein weed seeds and insect larvae are disrupted, said acoustical transducer means being coupled to said frame and being located rearwardly of said plow blade means so as to expose said broken up soil to said acoustical energy;
   d) an enclosure, said enclosure comprising an acoustical chamber which acoustical chamber contains said acoustical transducer means, said enclosure having openings for allowing said broken up soil to be exposed to said acoustical energy produced by said acoustical transducer means.

2. The plow apparatus of claim 1 wherein said acoustical transducer means produces acoustical energy within the range of 10–40 KHz.

3. A plow apparatus, comprising:
   a) a frame having front and rear ends, said frame having rotatable wheels mounted thereto, said wheels allowing said plow apparatus to move over ground, said frame being adapted to couple said plow apparatus to a towing vehicle;
   b) plow blade means for breaking up soil when said plow apparatus is moved along the ground, said plow blade means being coupled to said frame;
   c) acoustical transducer means for producing acoustical energy of a sufficiently high intensity so as to cause cellular disruption of biological life forms in said soil, wherein weed seeds and insect larvae are disrupted, said acoustical transducer means being coupled to said frame and being located rearwardly of said pow blade means so as to expose said broken up soil to said acoustical energy;
   d) an enclosure, said enclosure comprising an acoustical chamber which acoustical chamber contains said acoustical transducer means, said enclosure having openings for allowing said broken up soil to be exposed to said acoustical energy produced by said acoustical transducer means;
   e) conveyance means for conveying said soil that has been broken up by said plow blade means into said enclosure.

4. The plow apparatus of claim 3, further comprising:
   a) tilling means for tilling said soil that has been broken up by said plow blades means, said tilling means being coupled to said frame at a position that is rearwardly of said plow blades means;
   b) said acoustical transducer means being located relative to said tilling means such that soil exiting said tilling means is exposed to said acoustical energy from said acoustical transducer means.

5. The plow apparatus of claim 4 further comprising an enclosure, said enclosure comprising an acoustical chamber which acoustical chamber contains said acoustical transducer means, said enclosure having openings for allowing said soil to be passed therethrough for exposure to said acoustical energy.

6. The plow apparatus of claim 5 further comprising:
   a) power source means for providing power to rotate said tilling means and to move said conveyance means, said power source means being coupled to said tilling means and to said conveyance means;
   b) said plow blade means comprising plural ripper shanks that are arranged across a width of said frame at spaced apart intervals;
   c) said conveyance means comprising plural sprocket driven endless chains, said chains being arranged so as to be parallel to each other, said conveyance means also comprising plural slats that extend across said chains, said slats being spaced apart;
   d) said tilling means comprising plural flailing arms that extend out and are adapted to flail said soil.

7. A method of preparing a field, comprising the steps of:
   a) plowing soil in said field so as to break up said soil;
   b) after plowing said soil, scooping up said plowed soil;
   c) conveying said scooped soil to tilling means;
   d) tilling said plowed soil with said tilling means into smaller particles;
   e) exposing said tilled soil to high intensity acoustical energy so as to kill or destroy weed seeds and insect larvae in said soil.

* * * * *